United States Patent [19]

Tozaki et al.

[11] Patent Number: 4,999,719

[45] Date of Patent: Mar. 12, 1991

[54] MAGNETIC RECORDER-REPRODUCER INCLUDING A ONE-FRAME-TAKING CONTROL SEQUENCE

[75] Inventors: Katutoshi Tozaki; Yoshiaki Nakayama, both of Tokyo, Japan

[73] Assignee: Fuji Photo Film Co., Ltd., Japan

[21] Appl. No.: 357,679

[22] Filed: May 26, 1989

Related U.S. Application Data

[63] Continuation of Ser. No. 909,324, Sep. 19, 1986, abandoned.

[30] Foreign Application Priority Data

Sep. 25, 1985 [JP] Japan .................. 60-211780
Sep. 25, 1985 [JP] Japan .................. 60-211781

[51] Int. Cl.$^5$ .................................. H04N 5/782
[52] U.S. Cl. ...................... 360/35.1; 358/906
[58] Field of Search ............ 352/87, 171; 360/31, 360/35.1, 70; 358/310, 306

[56] References Cited

U.S. PATENT DOCUMENTS

| | | | |
|---|---|---|---|
| 3,974,522 | 8/1976 | Fukatsu et al. | 358/906 X |
| 4,340,951 | 7/1982 | Motoyama et al. | 360/31 |
| 4,447,837 | 5/1984 | Hirata et al. | 358/906 X |
| 4,562,495 | 12/1985 | Nishitochi et al. | 360/35.1 X |
| 4,570,188 | 2/1986 | Ichiyanagi | 360/31 |
| 4,584,613 | 4/1986 | Amaria et al. | 358/310 |
| 4,593,985 | 6/1986 | Minakuchi | 358/906 X |
| 4,672,475 | 6/1987 | Dahasho | 360/70 |
| 4,783,707 | 11/1988 | Venuto et al. | 358/906 X |

FOREIGN PATENT DOCUMENTS

| | | | |
|---|---|---|---|
| 54-140507 | 10/1979 | Japan | 358/906 |
| 2026187 | 5/1979 | United Kingdom | 352/27 |

OTHER PUBLICATIONS

Makkurodo Muviia Manual-Tech. Guide, Mar. 1985.

*Primary Examiner*—Donald McElheny, Jr.
*Attorney, Agent, or Firm*—Oliff & Berridge

[57] ABSTRACT

A magnetic recorder-reproducer capable of photographing under animation mode in a video system including a video camera, a video tape recorder and the like.

The magnetic recorder-reproducer according to the present invention has a mechanism, wherein recording is ended after a lapse of a photographing time corresponding to one frame from the time of the succeeding recording, and thereafter, rewinding of the tape for a joining taking and stand-by for the succeeding taking are performed, so that photographing under the animation mode can be easily carried out.

Furthermore, the magnetic recorder-reproducer according to the present invention has a warning device for issuing a warning in response to a signal indicating a state, where preparation for the photographing is completed, so that such a mistaken taking can be avoided that a hand or the like of the photographer are taken during the photographing under the animation taking mode.

2 Claims, 3 Drawing Sheets

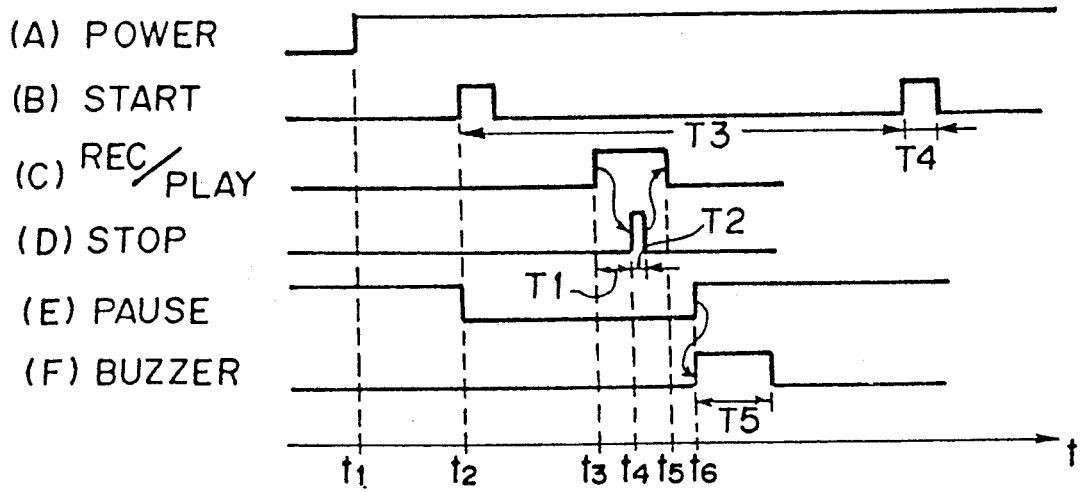
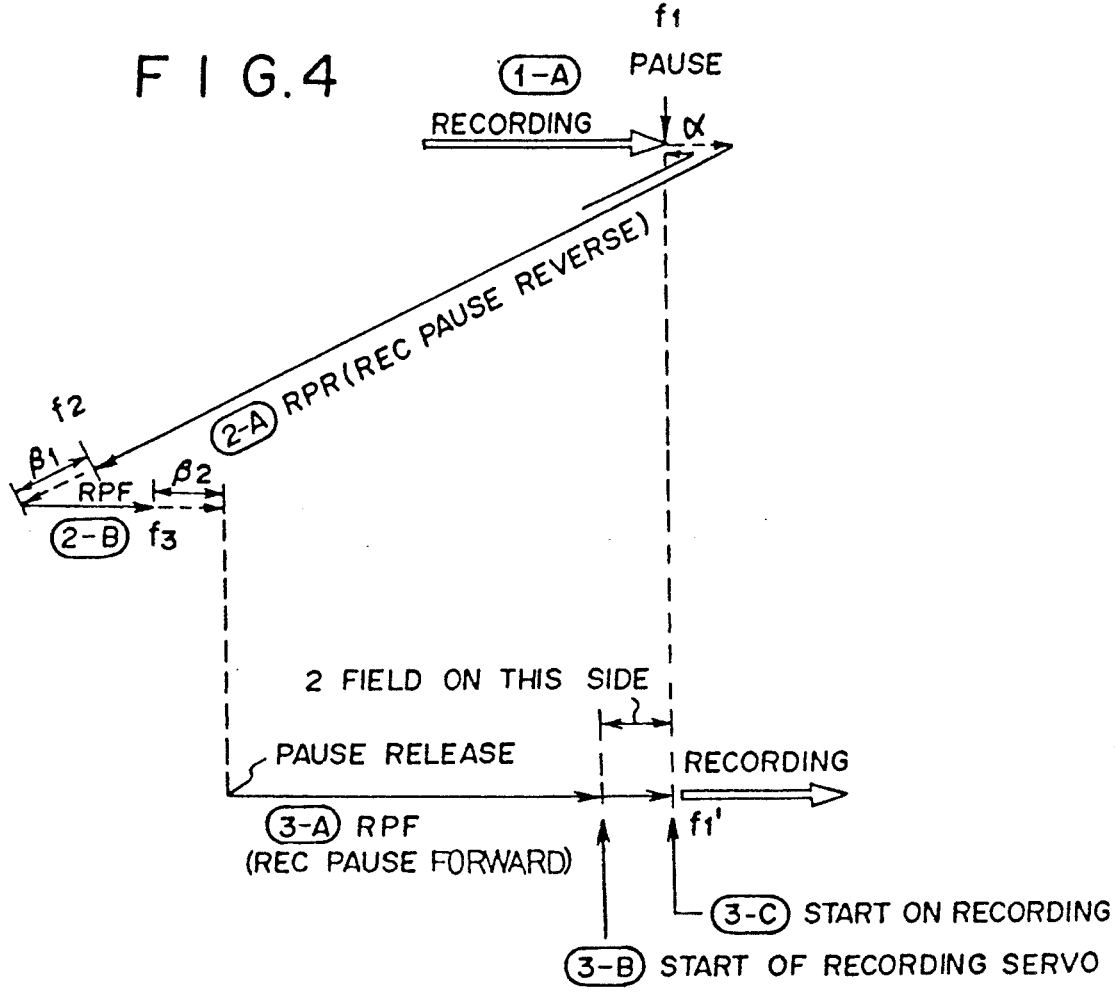

MAGNETIC RECORDER-REPRODUCER INCLUDING A ONE-FRAME-TAKING CONTROL SEQUENCE

This is a continuation of application Ser. No. 06/909,324 filed Sept. 19, 1986 now abandoned.

BACKGROUND OF THE INVENTION

1. Field of the Invention

This invention relates to a magnetic recorder-reproducer in a video system including a video camera, a video tape recorder and the like, and more particularly to a magnetic recorder-reproducer capable of photographing under an animation mode.

2. Description of the Prior Art

As one of several photographing methods using a video camera, there is a so-called "animation" taking. This photographing method uses a technique, wherein image signals are photographed in several fields, so that several frames of images can be reproduced in one second for example, and, by continuously reproducing this, a static object is reproduced as if driven.

The video camera used in this "animation" taking is capable of so-called "joining taking." This "joining taking" is such that when the photographing of the image signals in one field is completed, the next field is photographed. A drivably controlled servo system is employed, so that the photographed fields are continuous on a magnetic tape.

However, in the conventional video system, since the above-described "animation" taking requires complicated operations for the photographing, only some persons have performed the "animation" taking in actuality. Thus, necessity has been voiced for a system for easily performing the "animation" taking.

Furthermore, when automatic photographing is made during the photographing under this animation taking mode, a few seconds lapse between a recording operation and the succeeding recording operation. When a photographer puts his hand in front of a lens of the video camera to move a subject to be photographed during this period of time, there is a possibility of that his hand thus put out is erroneously photographed with the subject because the timing of the photo taking operation on the side of the video camera, shifting from a resting state to a recording operation, is not known by the photographer.

SUMMARY OF THE INVENTION

The present invention has been developed to obviate the above-described disadvantages of the prior art and has as its object the provision of a magnetic recorder-reproducer capable of easily photographing under the animation taking mode.

To achieve the above-described object, the present invention features that, in a magnetic recorder-reproducer capable of joining taking, upon completion of recording, a tape is rewound, made to stand by for the succeeding recording, and brought into a reproducing state at the time of the succeeding recording, whereby the speed and phase of the reproducing servo are locked and a reproducing system is switched over to a recording system at about the time of completion of the preceding recording. A mechanism is provided, in which the recording is ended, after a lapse of a photographing time corresponding to one frame from the time of the aforesaid succeeding recording, and thereafter, rewinding of the tape for the aforesaid joining taking and stand-by for the succeeding taking are performed.

Another object of the present invention is to provide a magnetic recorder-reproducer, wherein unintentional photo taking can be avoided under the animation taking mode.

To achieve the above-described object, the present invention features a magnetic recorder-reproducer in which, upon completion of recording, the tape is rewound, made to stand by for the succeeding recording, and switched into the reproducing mode at the time of the succeeding recording. The reproducing system is switched to the recording system at about the time of the completion of the proceeding recording. The magnetic recorder-reproducer including a mechanism which, after a lapse of photographing time corresponding to one frame from the time of the succeeding recording, ends said recording, and rewinds the tape for the aforesaid joining taking, and puts the recorder-reproducer in standby mode for the next use.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 3 is a timing chart showing the operation of the animation taking control circuit; and FIG. 4 is a sequence diagram showing the control sequence under the joining taking mode.

DETAILED DESCRIPTION OF THE INVENTION

Detailed description will hereunder be given of the preferred embodiment of a magnetic recorder-reproducer according to the present invention with reference to the accompanying drawings.

Prior to the description of the embodiment, the control sequence under the "joining taking" mode will be described with reference to FIG. 4. Referring to FIG. 4, in the magnetic recorder-reproducer having a function of the joining taking, upon completion of taking one photograph, a magnetic tape is stopped by a capstan inverting brake and a record processing circuit is automatically set at the state of recording pause. At this time, the magnetic tape normally overruns a desirable stop position, i.e. a record ending position $f_1$ (an overrun value $\alpha$). Subsequently, the magnetic recorder-reproducer is automatically set at rec pause reverse (RPR), whereby the magnetic tape is fed in reverse and stops at about a stop position $f_2$ being sufficiently more on this side than the aforesaid stop position $f_1$. An overrun value at this time is set at $\beta_1$ (1-A, 2-A).

Subsequently, the magnetic recorder-reproducer is automatically set at rec pause forward (RPF), whereby the magnetic tape is fed in the forward direction, stopped at $f_3$ (close to the stop position $f_2$), released from the rec pause, and prepared for the succeeding photographing. An overrun value at this time is $\beta_2$ (2-B). The purpose for performing this RPF is to avoid a sag of the magnetic tape due to a function of the mechanism.

When the succeeding photographing operation is started, the RPF operation is started again, a track recorded during the preceding photographing is reproduced, the speed and phase of the reproducing servo system are locked against the tape, and the recording meeting the preceding recording in the speed and phase is made possible (3-A). From this point, the servo system is switched from the reproducing system over to the recording system from two fields more on this side than the stop position $f_1$ in 1-A (3-B). Subsequently, recording of the succeeding photographing is started from the stop position f' in 1-A (3-C). Here, starting of recording of the succeeding photographing need not necessarily coincide with the stop position $f_1$, and, for example, the final two fields of the preceding recording may be rerecorded.

Figure 1:
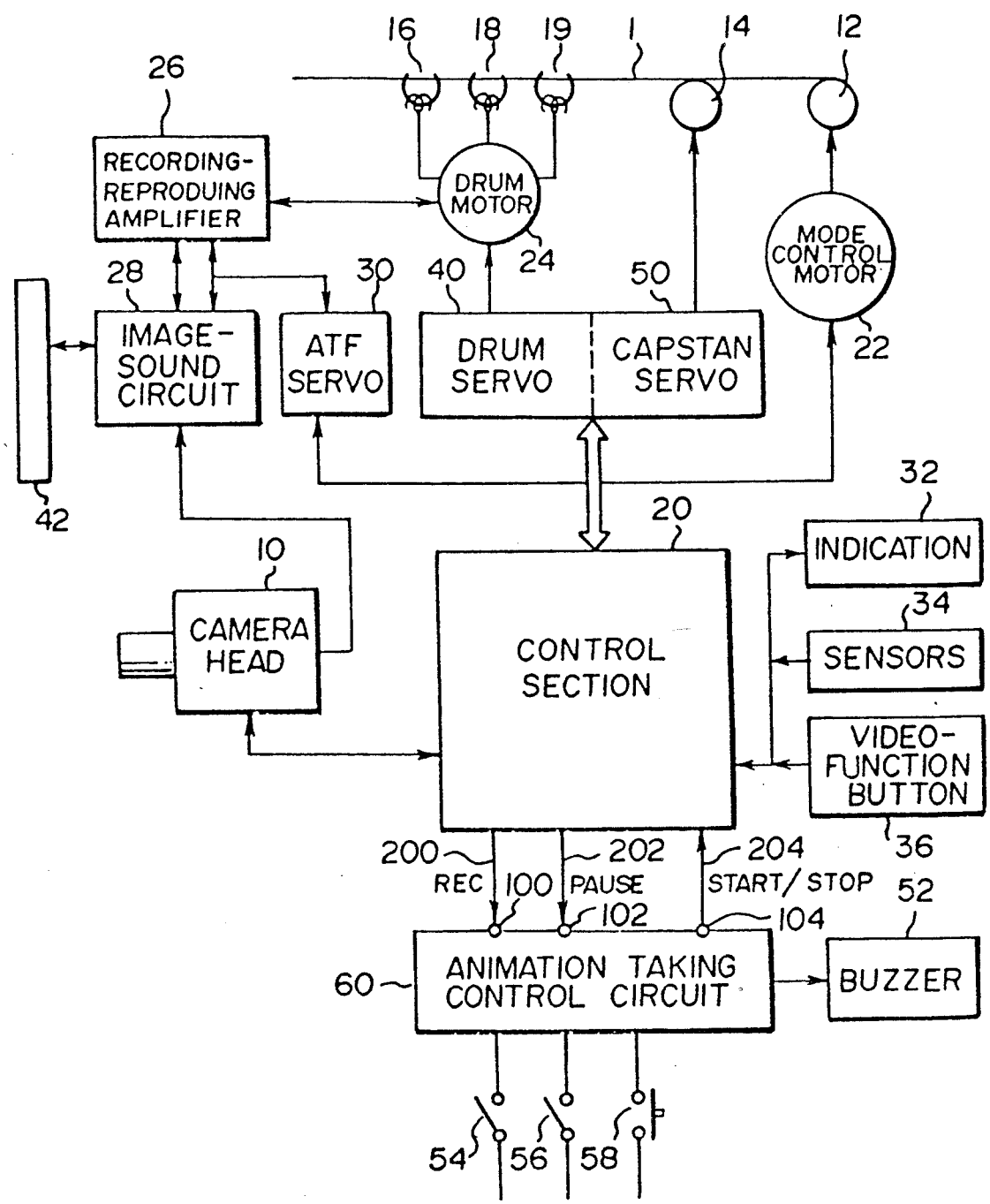
FIG. 1 is a block diagram showing the arrangement of the magnetic recorder-reproducer according to the present invention.

By the above-described control sequence, on the magnetic tape, it becomes possible to perform the "joining taking" for connecting the portion recorded by the preceding photographing. to the portion recorded by the succeeding photographing Next, FIG. 1 shows the arrangement of the magnetic recorder-reproducer according to the present invention. Referring to FIG. 1 designated at 10 is a video camera head, wherein images, etc. are controlled by a control section 20. The control section 20 further effects drivable control of respective servo systems including an ATF(Auto Tracking Follow) servo 30, a drum servo 40 and a capstan servo 50, control of the control circuit 60 of the animation taking, and drivable control of a mode control motor 22 for driving a tape reel 12.

Further, the control section 20 is inputted thereinto with output signals showing the various conditions of the video camera system, input signals from various sensors 34, an output signal from video function buttons 36 and the like, and controls various mechanisms of the video camera system in accordance with the aforesaid signals inputted thereinto.

The ATF servo 30 is a tracking control mechanism when an image signal track recorded on a magnetic tape is reproduced, wherein, for example, pilot signals doubly recorded on respective image tracks are detected from an image-sound circuit 28, and makes the drum servo 40 and the capstan servo 50 operate in such a manner that a magnetic head accurately follows the track. The drum servo 40 is a mechanism for servo-controlling a drum motor 24 for rotatably driving a drum provided on the outer peripheral surface thereof with an A head 16, a B head 18 and an erasing head 19, which, for example, during recording, controls the speed and phase of recording of an input image signal, and, during reproducing, controls the speed and phase of reproducing of an output from the ATF servo system.

Here, the erasing head 19 is a flying erase head. When a fixed type erasing head is used, so-called rainbow noises are produced due to the interference of a recorded signal before being erased with a recorded signal after being erased.

To perform the aforesaid "joining taking" in the video camera system as described above, when a release button among the video function buttons 36 is operated to complete photographing of a first scene for example, the control section 20 sets the video camera system at rec pause state, operates the drum servo 40, the capstan servo 50 and the mode control motor 22, whereby the operations RPR (2-A) and RPF (2-B) are performed, thus completing a first recording. Thereafter, when a second photographing is performed, the control section 20 operates the ATF servo 30, the drum servo 40, the capstan servo 50, etc., whereby the operation of RPF (3-A, 3-B) as shown in FIG. 4 is operated, thus enabling the perforing of the joining taking.

Designated at 42 is a connector, through which connection can be made with an external mechanism, such as a television set.

Figure 2:
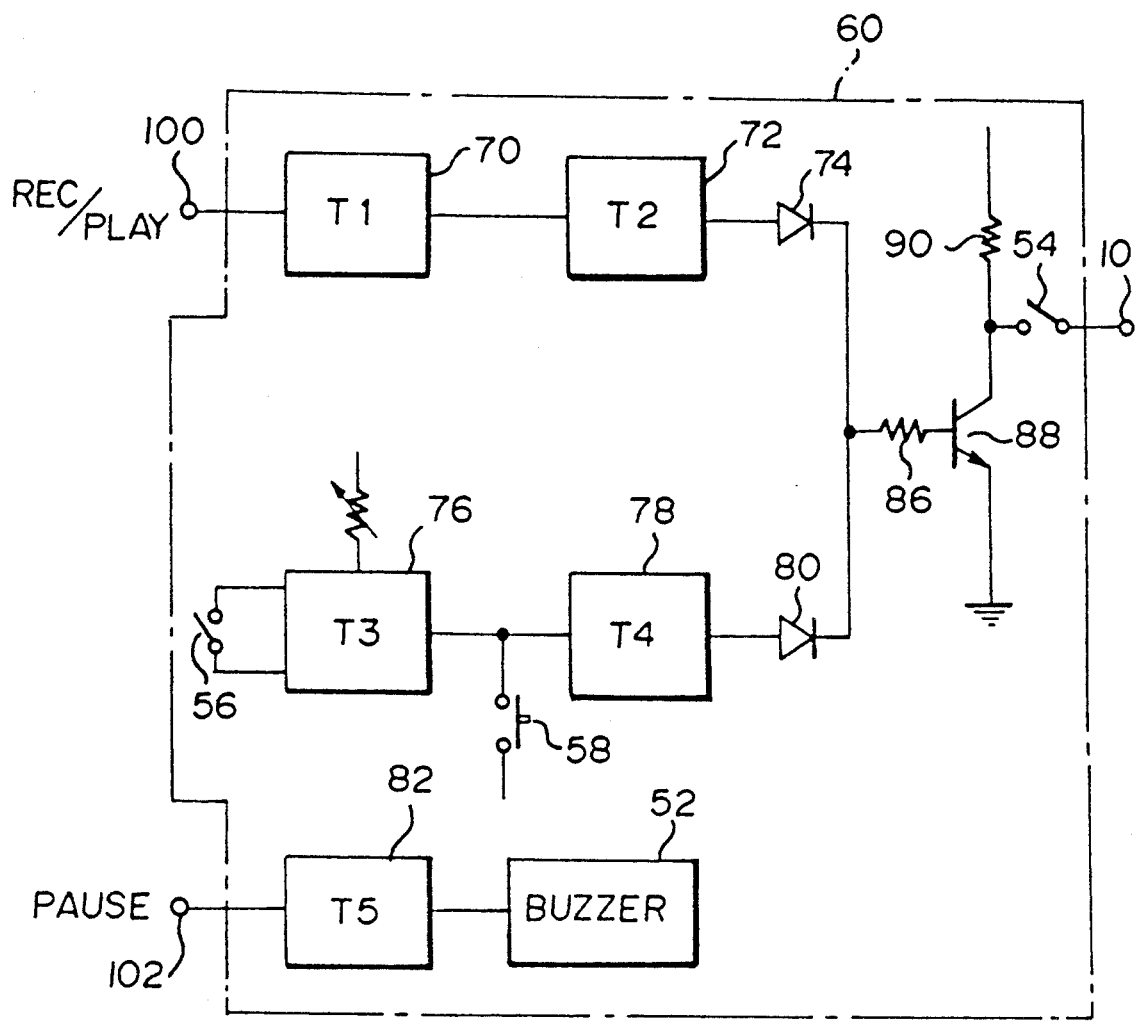
FIG. 2 :s a block diagram showing the arrangement of the animation taking control circuit of as shown in FIG. 1.

As shown in FIG. 2, the animation taking control circuit 60 incorporates therein various timers such as time setting circuits 70 and 72 for performing control of taking times when photographing is made under the animation taking mode, a time setting circuit 76 for performing the start of one frame photographing in response to a taking command, a time setting circuit 78 for performing control of animation taking interval times under the automatic animation taking mode, and a time setting circuit 82 for performing the driving of a buzzer 52 to begin the preparation for photographing. Here, "one frame" in one frame photographing refers to a static subject photographed and recorded by 4 fields, 8 fields and 12 fields as a unit, for example. In this example, it becomes possible to reproduce 15 frames, 7.5 frames and 5 frames per sec. The control circuit 60 is connected to the control section 20 through connecting lines 202 and 204, and further, connected to an animation taking switch 54, as being a main switch for the animation taking, a one frame taking switch 58 for manually performing an actual photographing after the completion of preparation for the animation taking, and a timer switch 56 for performing the automatic animation taking.

In the magnetic recorder-reproducer with the above-described arrangement, portions other than the animation taking control circuit 60 are not varied in arrangement from the conventional example, and hence, action of the animation taking control circuit 60 will be described hereunder with reference to the timing chart shown in FIG. 3. Under the animation taking mode, the animation taking switch 54 is closed. Power is supplied from a power source at a time $t_1$. Thereafter, the one frame taking switch 58 is closed for the manual animation taking. And, the timer switch 56 is closed for the automatic animation taking. During the manual animation taking, a recording start signal of a pulse width $T_4$, which is set in a $T_4$ time setting circuit 78, is immediately outputted to the control section 20. During the automatic animation taking, the recording start signal of the pulse width $T_4$, which is set in the $T_4$ time setting circuit 78, is outputted at a time $t_2$ for example, and at intervals of time $T_3$ set in the $T_4$ time setting circuit 78 to the control section 20 through the diode 80, the resistor 86, the transistor 88 and the terminal 104.

The control section 20 outputs a recording signal (REC) rising at a time $t_3$ after a lapse of a predetermined period of time upon receiving the start signal to a terminal 100 of the animation taking control circuit 60. In the animation taking control circuit 60, a stop signal of a pulse width $T_2$ is produced by the $T_1$ time setting circuit 70 and the $T_2$ time setting circuit 72 at the time $t_4$ after a lapse of the time $T_1$ from the time $t_3$, and this stop signal is outputted to the control section 20 through a diode 74, the resistor 86, the transistor 88 and the terminal 104. In the control section 20, the recording signal is made to rise at a time $t_5$ after a lapse of a predetermined time upon receiving the stop signal, whereby the recording operation is stopped.

Thereafter, a pause signal (PAUSE) indicating the state, when the preparation for photographing is completed, is outputted from the control section 20 to a terminal 102 of the animation taking control circuit 60 at a time $t_6$. In a $T_5$ time setting circuit 82, a driving signal to operate a buzzer 84 for a period of time from a rising time of the pause signal to the time $T_5$ is outputted to the buzzer 84. As a result, the photographer photographing under the animation taking mode can learn that preparation for the succeeding animation taking in completed through a warning sound given by the buzzer 84.

A warning sound other than the warning sound, which is given at the time of completion of the preparation of photographing may be given during recording. With this arrangement, a time interval from the time of completion of the recording operation to the time of completion of the preparation of photographing can be reliably grasped.

As described above, according to this embodiment, during photographing under the animation taking mode, the photographer can avoid mistakenly putting his hand out in front of the lens of the video camera while switching the subject to be taken during recording.

As has been described hereinabove, by use of the magnetic recorder-reproducer according to the present invention, photographing under the animation taking mode can be performed and the recording timing of the video camera can be accurately grasped, so that mistaken taking during photographing under the animation taking mode can be obviated.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A magnetic recorder-reproducer comprising:
photographing means for photographing an object;
recording and reproducing means responsive to an output signal from said photographing means for recording information of said object onto a magnetic tape in a recording mode and for reproducing information on the tape in a reproducing mode;
the recording and reproducing means including servo means for regulating operation of the recording and reproducing means in the recording and reproducing modes;
record signal generating means for generating a record signal during the actual recording operation by said recording means;
first control means, responsive to an input of a record start signal, for placing the recording and reproducing means in the reproducing mode to fix the speed and phase of the servo means during a reproducing mode and, substantially at the point of completion of a preceding recording, switching said recording and reproducing means from the reproducing mode over to the recording mode to allow said recording means to start its recording operation; the first control means being responsive to input of a stop signal, for stopping the recording operation by said recording means and for rewinding said magnetic tape by a given amount to prepare for the succeeding photographing;
operating means for indicating a one-frame-taking recording operation; and
second control means, responsive to an output signal from said operating means, for outputting said record start signal to said first control means, for receiving said record signal generated by said record signal generating means as said record start signal is output, and, after a lapse of a predetermined time for the input of said record signal, for outputting said stop signal to said first control means, thereby executing a predetermined field number of one-frame-takings.

2. A magnetic recorder-reproducer comprising:
photographing means for photographing an object;
recording and reproducing means responsive to an output signal from said photographing means for recording information of said object onto a magnetic tape in a recording mode and for reproducing information on the tape in a reproducing mode;
the recording and reproducing means including servo means for regulating operation of the recording and reproducing means in the recording and reproducing modes;
record signal generating means for generating a record signal during the actual recording operation by said record means;
first control means, responsive to input of a record start signal, for placing the recording and reproducing means in the reproducing mode to fix the speed and phase of the servo means during a reproducing mode and, substantially at the point of completion of a preceding recording, switching said recording and reproducing means from the reproducing mode over to the recording mode to allow said recording means to start its recording operation; the first control means being responsive to input of a stop signal, for stopping the recording operation by said recording means and for rewinding said magnetic tape by a given amount to prepare for the succeeding photographing;
operating means for indicating a one-frame-taking recording operation;
second control means, responsive to an output signal from said operating means, for outputting said record start signal to said first control means, for receiving said record start signal generated by said record signal generating means as said record start signal is output, and, after a lapse of a predetermined time from the input time of said record signal, for outputting said stop signal to said first control means, thereby executing a predetermined field umber of one-frame-takings; and
pause signal generating means for stopping the output of a pause signal when said record start signal is output from said second control means and for generating said pause signal when said stop signal is output from said second control means to thereby complete preparation for the succeeding photographing; and alarm means operable at the time of output of said pause signal for issuing an alarm that preparation for the succeeding photographing is completed.

* * * * *